US006130610A

United States Patent [19]

Schilsky et al.

[11] Patent Number: 6,130,610

[45] Date of Patent: Oct. 10, 2000

[54] SECURITY SYSTEM

[76] Inventors: Lawrence Schilsky, 4 Stonington Heights, Briarcliff Manor, N.Y. 10510; Alan Schilsky, 56 Byram Ridge Rd., Armonk, N.Y. 10504

[21] Appl. No.: 09/412,214

[22] Filed: Oct. 5, 1999

[51] Int. Cl.[7] ........................ H04Q 7/00

[52] U.S. Cl. ........................ 340/539; 340/541; 340/567; 340/693; 367/93; 362/276

[58] Field of Search ........................ 340/567, 552, 340/691, 541, 693, 539; 362/276; 367/93

[56] References Cited

U.S. PATENT DOCUMENTS

| | | | |
|---|---|---|---|
| 4,970,494 | 11/1990 | Keely et al. | 340/567 |
| 5,457,442 | 10/1995 | Lucero | 340/693 |
| 5,463,595 | 10/1995 | Rodhall et al. | 367/93 |
| 5,477,212 | 12/1995 | Rumpel | 340/691 |
| 5,649,761 | 7/1997 | Sandell et al. | 362/276 |
| 5,652,567 | 7/1997 | Traxler | 340/552 |
| 5,867,099 | 2/1999 | Keeter | 340/567 |

*Primary Examiner*—Jeffery A. Hofsass
*Assistant Examiner*—Phung Nguyen
*Attorney, Agent, or Firm*—Lucas & Just

[57] ABSTRACT

A self-contained security system is disclosed. Operatively connected to each other within a single housing are a power supply, a motion detector, a device for arming the security system and a signaling device, such as a siren, all of the foregoing being connected to a control module so that the signaling device is activated when motion is detected while the security system is armed.

15 Claims, 3 Drawing Sheets

SECURITY SYSTEM

The present invention relates to security devices and, in particular, relates to a single integrated unit comprising an entire security system of matched components.

BACKGROUND OF THE INVENTION

Even though crimes against persons have fallen dramatically in recent years, crimes against property, notably burglary, have not enjoyed the same rate of decline. One of the most effective deterrents to crimes against property is a security system.

Security systems are generally sophisticated devices which are complicated to install. As a result, installations are usually done by professionals. They have to carefully select, from the thousands of components available, those that are desirable or necessary for the security system for the particular installation they are making. They then snake the wires throughout the area to be protected in order to connect the final system. Even an installation in a small house or office runs into thousands of dollars.

While some do-it-yourself security systems are available, they are still difficult and time-consuming to install. In addition, the average homeowner or small business operator does not have the requisite expertise to select the proper components which are required for an effective system. It is especially important that the parts be matched so that the system works properly.

SUMMARY OF THE INVENTION

The applicant has now invented a security system which is an entirely self-contained unit. One need do nothing more than plug in the unit and it is ready for operation. Even the most inept person is capable of installing the system since it involves nothing more than setting it on a shelf or table and plugging it in. The unit preferably includes a motion detector for detecting motion in the area to be protected and either visual or audio signaling systems, preferably audio.

BRIEF DESCRIPTION OF THE DRAWINGS

These and other aspects of the present invention may be more fully understood with reference to the drawings wherein.

DETAILED DESCRIPTION OF THE DRAWINGS

Figure 1:
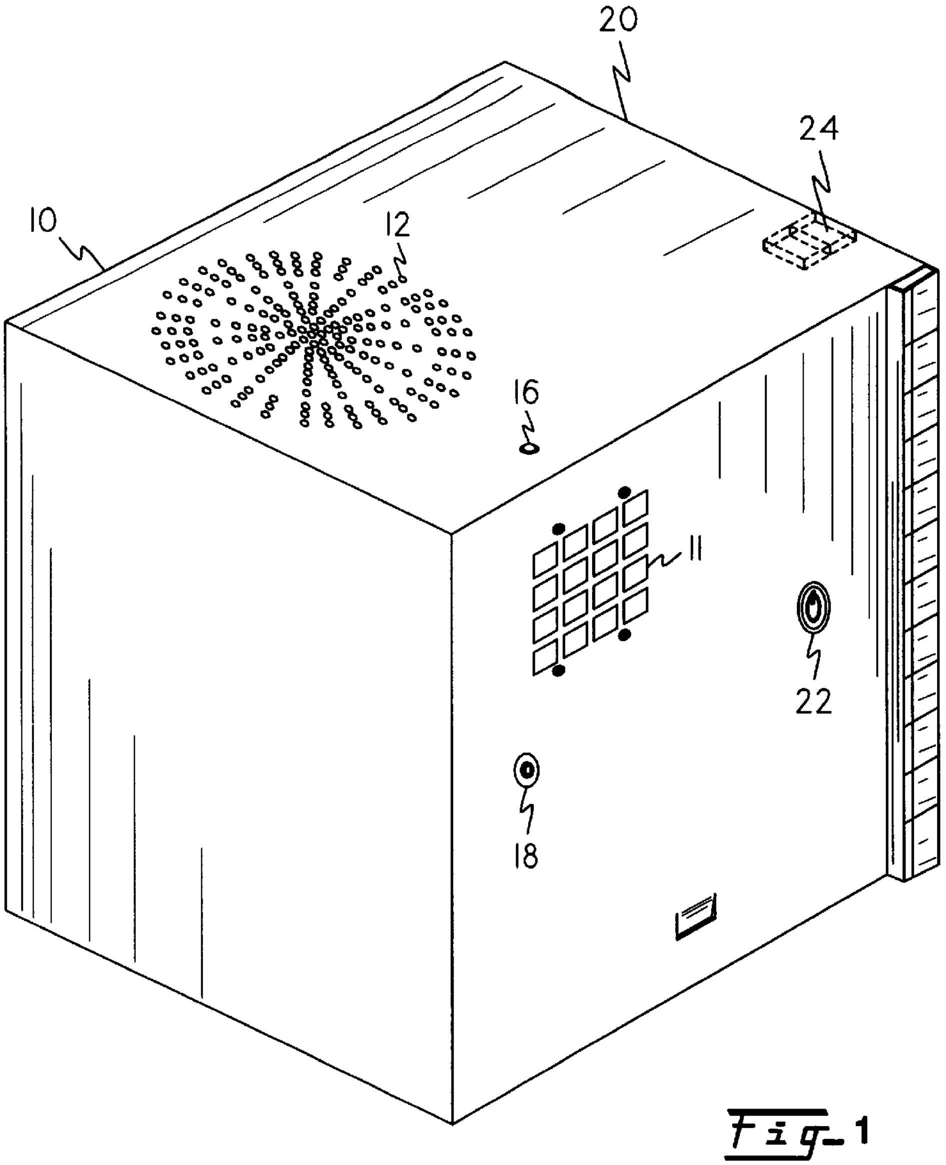
FIG. 1 is a perspective view of the exterior of a security system made in accordance with the present invention.

Referring first to FIG. 1, there is shown a housing 10. Located within the housing behind a plurality of windows 11 is a motion (not shown) for purposes of detecting motion anywhere within the area which the security device can "see." The preferred motion detector is a passive infrared detector. However, in warm climates a passive infrared detector may not be suitable. In such climates the preferred embodiment is a microwave detector. Of course, both a passive infrared detector and a microwave detector may be used, either in conjunction or with a selectivity switch. Other known detectors can also be used, as can those developed in the future. The only requirement of the motion detector is that it detect motion.

A series of holes 12 are provided so that an audible warning, preferably a siren (not shown), mounted behind the holes can give an audio warning if there is motion within the area. The audible warning may alternately be, for example, a horn, a bell or synthesized sound. An indicator light such as an LED 16 can be employed if desired to show whether the unit is armed or disarmed. The indicator light is preferably lit when the unit is armed.

Figure 2:
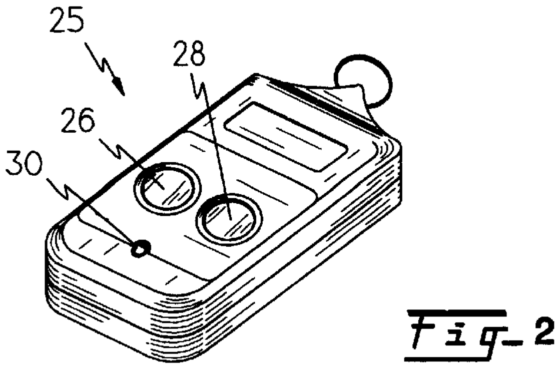
FIG. 2 shows a remote transmitter suitable for use in conjunction with the security system of the present invention.

The housing 10 is provided with an antenna 18 for receiving signals from a remote transmitter (FIG. 2). It is preferred to use a remote transmitter for arming and disarming of the security system of the present invention. A remote transmitter has a number of advantages. A primary advantage is that the security system can be armed and disarmed without the need for physical proximity. If, for example, the security system is to be used in a warehouse, it is better to have it placed at a height which is above the reach of people who work in the warehouse. A remote transmitter is thus desirable for arming and disarming the security system so that one does not have to climb a ladder to reach a switch located on the housing. A further advantage to a remote transmitter is that the unit can be armed or disarmed from a considerable distance. In this way, one can arm the security system from a distance and thereby not inadvertently set off the alarm while departing from the protected area. A third advantage of a remote transmitter is that the person arming the system takes the "switch" with him or her and, thus, there is no switch that a trespasser could operate to disarm the unit.

An optional simple ON-OFF switch 22 can be provided in the cabinet and can be added remotely or mounted on the unit. As shown, the ON-OFF switch 22 is suitably a key switch which is operated in conventional manner by turning it in one direction to arm the system and turning it in the opposite direction to disarm the system. Use of the ON-OFF key 22 allows for the addition of keypads (not shown) to remotely arm the unit.

The interior workings of the security device (not shown, but discussed below) are preferably accessible from panel 20 (not shown, but indicated) of housing 10. The panel 20 is suitably protected from tampering by employing a contact switch 24 (shown in dotted lines), suitably a microswitch, located behind panel 20 of housing 10. If the system is armed and panel 20 is opened, the alarm will be set off.

In order to avoid inadvertently setting off the alarm when arming the security system, there is preferably employed a delay circuit of approximately ten seconds to five minutes between the time that the system is armed and the time that it begins to function. In order to prevent the alarm from continuing to operate when it is no longer necessary or if the alarm has been inadvertently set off, such as by a cat running across the room, the alarm preferably shuts off after a predetermined time, e.g. two minutes. However, if there continues to be motion in the protected area, the alarm will continue to cycle every two minutes until motion ceases. If panel 20 is removed from the housing, the alarm will similarly cycle every two minutes until the panel is replaced. It is important to understand that the predetermined cycle means that the alarm will operate virtually continuously when there is motion or when the panel 20 has been removed. The predetermined cycle can, of course, be adjustable to allow for various situations, e.g. a commercial area vs. a residential area.

Referring now to FIG. 2, there is shown a remote transmitter suitable for use in the present invention. The transmitter contains two buttons 26 and 28. One of the buttons is used for arming the system and the other button is used for disarming the system. As with a typical garage door opener, the result could be accomplished with a single button; however, the two-button system is preferred since it is less likely that an erroneous signal will be sent to the security system. Transmitter 25 also suitably includes an LED 30 which lights up when either of buttons 26 or 28 is depressed. This indicates that the battery in the transmitter 25 is good and that a signal is being sent.

Figure 3:
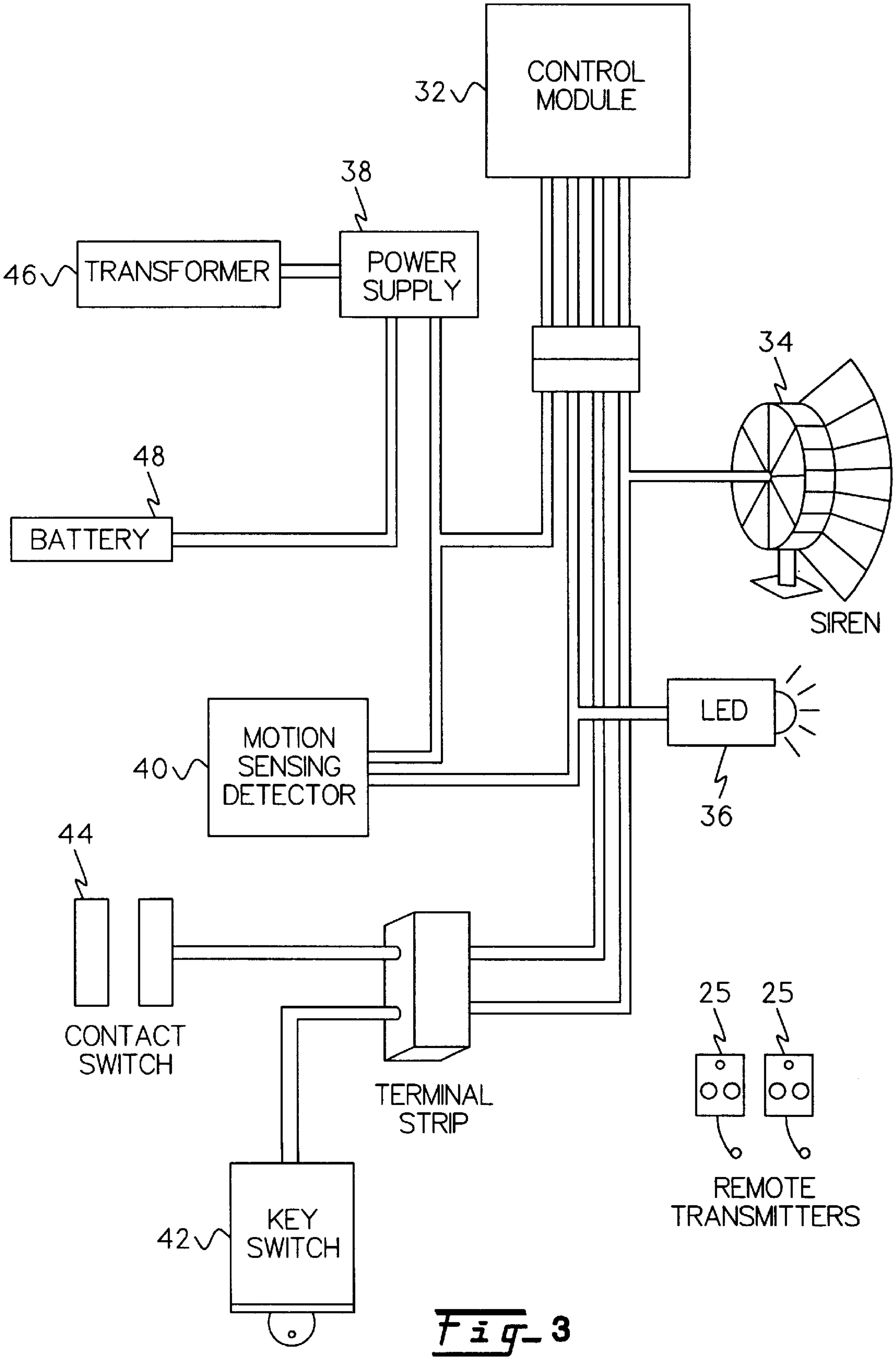
FIG. 3 is a circuit diagram of a security system in accordance with the present invention.

Referring now to FIG. 3, there is shown the inner workings of the security system of the present invention. Control module 32 includes an RF receiver for receiving arm and disarm signals from the remote transmitter (FIG. 2) or from the key switch 42. The control module 32 also contains an output to siren 34 and optionally includes a timer, such as a timing circuit, (not shown) which can be pre-set at the factory or which can be made adjustable. The timer deactivates the alarm after a predetermined period of time, suitably 1–5 minutes. In addition to the siren 34, the control module 32 is also connected to a power supply 38, a motion sensing detector 40, a key switch 42 and a contact switch 44. The power supply 38 is connected to a transformer or electrical circuit 46 for supplying low voltage to the power supply. There is optionally provided a back-up battery 48 in case of power failure. The power supply 38 is selected to have sufficient power to run control module 32 and siren 34 and also to recharge back-up battery 48 if one is employed. The siren preferably has an output of at least 115 dB. The sensor 40 is connected to both the power supply 38 and the control module 32. The sensor 40 is suitably a passive infrared detector and/or microwave detector as previously discussed. Optional key switch 42 (also shown as element 22 in FIG. 1) can control the arming and disarming of module 32. Contact switch 44, designed to prevent tampering with the unit (also element 24 in FIG. 1), is also connected to the module 32, as is LED 36 (also element 16 in FIG. 1).

It is preferred that a back-up battery 48 be employed so that the unit can continue to function even if power to the unit fails, e.g. in a black-out or when a trespasser unplugs the unit or disables its supply circuit. The back-up battery should provide approximately the same voltage as the voltage supplied by transformer 46. Furthermore, power supply 38 feeds a trickle charge to back-up battery 48 from transformer 46 to keep the back-up battery 48 constantly charged. The back-up battery 48 is suitably of the lead-acid type.

Figure 4:
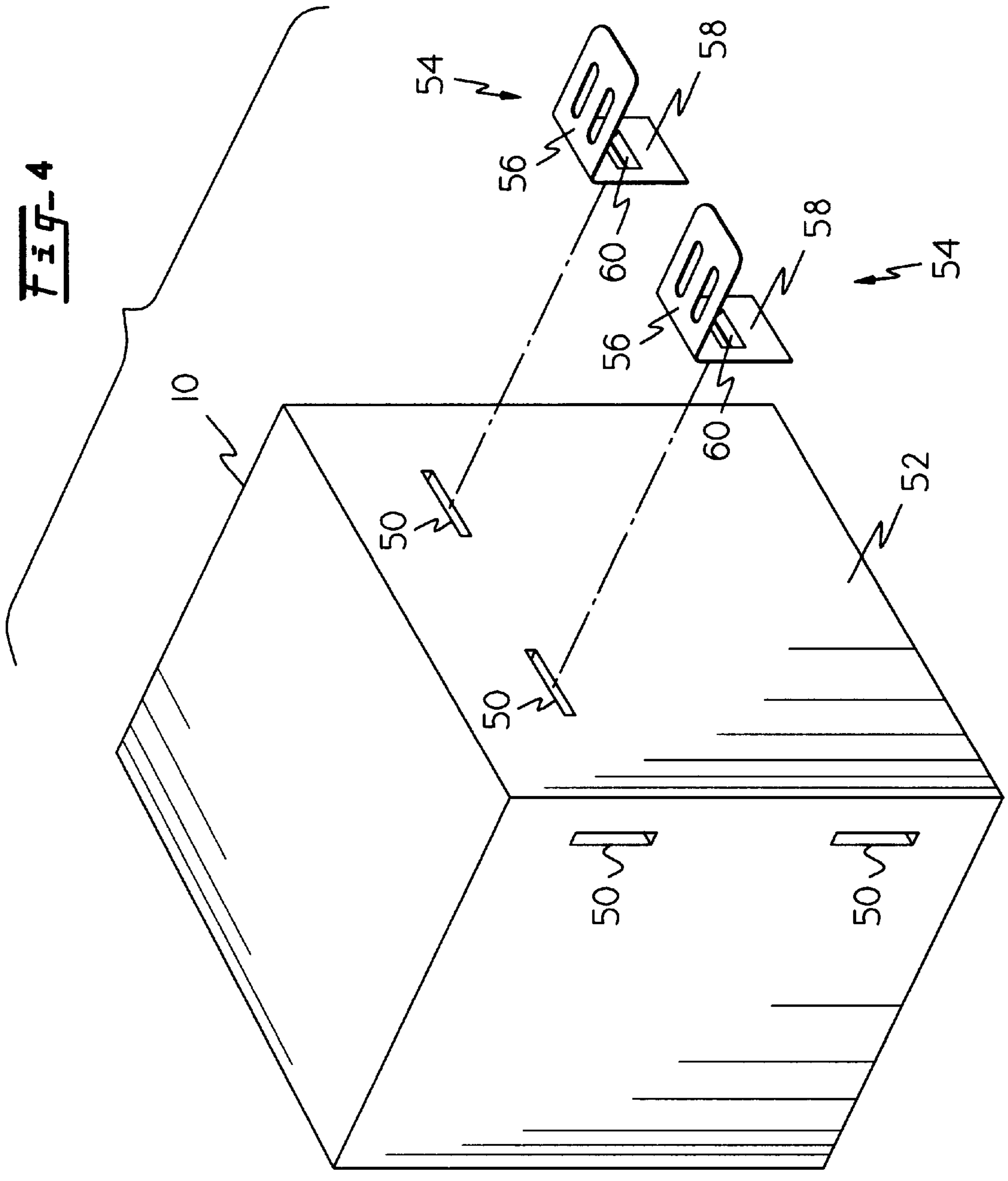
FIG. 4 shows one means for mounting the housing of the security system of the present invention to a ceiling.

Referring now to FIG. 4, there is shown a preferred method of mounting the housing of the security system of the present invention to a ceiling. The housing 10 is provided with two slots 50 in panel 52. Brackets 54 are L-shaped with a top leg 56 and a side leg 58. Extending from side leg 58 is a tab 60 which fits into the corresponding slot 50 in panel 52 of housing 10. The bracket 54 is suitably secured to the ceiling by means of screws extending through leg 56. Corresponding slots and brackets are also present on the panel of housing 10 opposite to panel 52. Additional slots 50 are also shown in the adjacent panel for wall mounting rather than ceiling mounting.

As stated, a similar type of mounting system can be used for wall mounting if desired. Whether mounted on the wall or the ceiling using the bracket-and-slot method, the principal advantage is that one need not install a shelf, nor need one insert screws from the interior of the housing 10 and possibly disrupt the electronics inside the housing. Wall or ceiling mounting is particularly desirable when protecting a stairwell, such as the stairwell leading to the roof of a building, or when protecting a storeroom.

It must also be appreciated that the security system of the present invention can also be used solely as a portable system, i.e. be operated only with battery power. This is particularly advantageous for protecting various areas of construction sites prior to the installation of electricity to the site. For example, if one of the contractors or subcontractors stores his tools in a limited area but has no power to feed a security system, the contractor or subcontractor can mount the security system of the present invention and feed it solely with battery power.

Obviously, many changes and additions can be made to the instant security system if desired. For example, one could attach an additional alarm, such as a siren, that operates outside of the area being protected, e.g. outdoors. Adding such a device is no more difficult than connecting an auxiliary radio speaker to a radio. Similarly, a visual device, such as a strobe light, could be added to the security system, either mounted on the housing for the security device or as a separate entity.

Various other changes can also be made to the applicant's security system without affecting the basic simplicity of the device. It will therefore be understood that the claims are intended to cover all changes and modifications of the preferred embodiment of the invention herein chosen for the purpose of illustration which do not constitute a departure from the spirit and scope of the invention.

What is claimed is:

1. A self-contained security system comprising an outer housing and, positioned entirely within said outer housing:

a control module;

at least one motion detecting device for detecting movement in an area proximate the housing, said motion detecting device being entirely within the housing such that the motion detecting device is embedded within the housing for concealment of the motion detecting device and having a plurality of windows in said housing for allowing said motion detecting device to detect motion in said area proximate to said housing;

at least one signaling device for emitting a signal;

at least one circuit for receiving a signal to arm and disarm the system; and a power supply;

said motion detecting device, said signaling device, said circuit for arming and disarming and said power supply being operatively connected to said control module so that after said circuit for arming and disarming receives a signal to arm and said motion detecting device detects motion, said control module sends a signal to said signaling device to cause it to operate.

2. The self-contained security system of claim 1 further comprising a back-up battery within said housing operatively connected to said control module.

3. The self-contained security system of claim 1 wherein the signaling device provides an audio signal.

4. The self-contained security system of claim 3 wherein said audio signal is a siren.

5. The self-contained security system of claim 1 further comprising, mounted to said housing and visible from the exterior thereof and operatively connected to said control module, a signal light to indicate when said security system is armed.

6. The self-contained security system of claim 1 wherein the said signal to arm and disarm is emitted from a remote control which is located exteriorly of said housing.

7. The self-contained security system of claim 1 wherein the said signal to arm and disarm is a key switch mounted on said housing and rotatable between armed and disarmed positions.

8. The self-contained security system of claim 1 wherein said housing comprises a number of panels, at least one of which is removable and in which there is a tamper switch operative to engage said signaling device if said removable panel is removed while the security system is armed.

9. The self-contained security system of claim 1 wherein said power supply is operatively connected to a source of low voltage.

10. The self-contained security system of claim 1 further comprising a delay circuit operatively connected to said circuit for arming and disarming to delay the arming of the security system for a pre-set time after the switch is operated.

11. The self-contained security system of claim 10 wherein said pre-set time is about ten seconds to about five minutes.

12. The self-contained security system of claim 1 wherein said control module contains a timer circuit effective to terminate said signaling device a pre-set time after it has been caused to operate.

13. The self-contained security system of claim 12 wherein said pre-set time is about two to about five minutes.

14. The self-contained security system of claim 1 wherein said power supply comprises a battery.

15. The self-contained security system of claim 1 further comprising mounting brackets and wherein said housing comprises a number of panels, at least two of said panels having slots for engaging tabs extending from said mounting brackets.

* * * * *